Oct. 11, 1932.  G. H. MAAS  1,881,772
DOSE MEASURING DEVICE FOR LIQUID DISPENSING CONTAINERS
Filed Jan. 23, 1931

INVENTOR.
GEORGE H. MAAS.
BY W. F. Woolard
ATTORNEY.

Patented Oct. 11, 1932

1,881,772

UNITED STATES PATENT OFFICE

GEORGE H. MAAS, OF MILWAUKEE, WISCONSIN, ASSIGNOR OF ONE-HALF TO MICHAEL J. GALLOGLY, OF MILWAUKEE, WISCONSIN

DOSE MEASURING DEVICE FOR LIQUID DISPENSING CONTAINERS

Application filed January 23, 1931. Serial No. 510,710.

My invention relates to measuring devices for liquid dispensing containers, and is primarily designed for use in connection with bottles containing medicines, in which it is particularly important that the dosage supplied from the bottle or other container be correctly measured and the quantity thereof accurately determined.

The invention resides in a dose measuring device acting normally and efficiently as a stopper or seal for the container to prevent the contents thereof from being withdrawn except when desired. A passage formed as a part of the dose measuring device, and located in the plane of the contact between the said device and the container, is provided with a valve which remains closed at all times, except when opened as desired to permit the flow of a liquid from the container to the measuring device, and thus segregate a predetermined quantity from the bulk stored in the container.

A yielding connection between the dose measuring device and the container is established, whereby the said valve may be opened to permit the flow of liquid at the desired times. The resilient feature in the structure of the yielding connection acts automatically to return the valve to its normally closed and sealing position.

The proportions of the parts entering into the construction of the dose measuring device are such that the said device may be reversed as to position, and entered into the neck of the container, for convenient packing and transportation, when containers equipped with the dose measuring device are supplied to the trade by the manufacturers of the unit, comprising the dose measuring device and the container.

Having outlined the nature and purposes of my invention, I will now describe specifically some of the constructional forms in which it has been embodied, and will point out the novelty residing therein in the appended claims.

Figure 1:
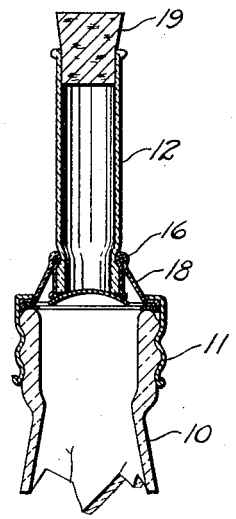
Figure 1 is a vertical, central, sectional view of the upper part and neck of a bottle, with my invention in its preferred form applied thereto.

In the drawing, the numeral 10 indicates the neck of a bottle of modern type, the upper end of which is provided exteriorly with a helical groove formed as a thread for engagement by a corresponding thread in the cap 11. The cap 11 is punched out centrally to provide an opening, the inturned margins surrounding the opening acting to clamp the dose measuring device upon the bottle, in a manner to be hereinafter described.

The element forming the dose measuring device preferably is constituted as a short section 12 of glass or other transparent tubing, the diameter and length of which are so proportioned that when filled, the section, will contain a dose in the exact quantity desired. A cover plate 13 is arranged over the mouth of the bottle, the said cover plate being provided near its margin with a circular row of perforations 14, and its center portion may be displaced from the plane of the disc so as to produce a raised embossment 15. The lower end of the tubular section 12 is surrounded by a resilient rubber nipple 16, substantially of the cross-sectional formation shown, in which the lower end of the tubular section 12 is embraced by the depending inner band 17 of the nipple, while flaring outwardly and downwardly with relation thereto is a circular skirt 18, the lower margin of which is folded over and made to embrace the margins of the cover plate 13 upon both of its sides. In such position of assembly, the lower edge of the tubular section 12 rests upon the upper side of the cover plate 13, and the lower edge of the band 17 acts as a seal in the line of contact between the lower end of the tubular section and the cover plate. The turned under lower edge of the skirt of the nipple forms a sealing gasket when the dose measuring device is placed over the mouth of the bottle.

The perforated cap 11 is passed over the tubular section 12 and the nipple 16, with the inturned edge of the cap bearing upon the skirt at the upper side of the cover plate 13. The cap 11 will be threaded on to the neck of the bottle, and thus connect the dose measuring device with the bottle by means of a joint which ordinarily is secured against leakage. In applying the dose measuring device to the bottle, the resilient skirt 18 is put under a slight tension, and this action tends to maintain the lower end of the tubular section 12 in contact with the cover plate, and to return it to that position, if displaced.

The bottle 10 will be filled with the bulk of the prescribed medicine, and the dose measuring device, acting also as a stopper for the bottle, will be applied thereto. The open upper end of the tubular section 12 will be closed by a cork 19. When it is desired to draw a dose from the bulk contained in the bottle, the tubular section 12 is turned or tilted slightly to one side so as to open the valve between the lower end of the tubular section 12 and the surface of the cover plate 13. Upon inverting the bottle, the liquid will flow through one or more of the openings 14 in the cover plate 13, and pass into the tubular section 12 through the opening of the valve, produced by turning the tubular section from its axial alignment with the bottle. When the dose measuring device has been filled, the pressure upon the same will be relaxed, and the resiliency of the connecting nipple 16 will again seat the lower end of the tubular section 12 upon the cover plate 13, and close the valve to prevent the return flow of the liquid withdrawn from the bulk. In this way the accurate measurement of a dose in the desired quantity is assured. The cork 19 may then be withdrawn and the dose taken directly or otherwise from the dose measuring tubular section.

Figure 4:
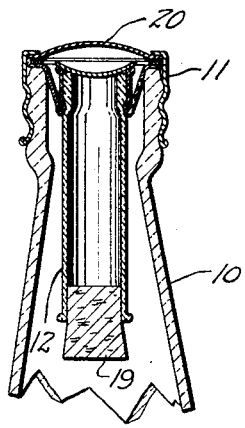
Fig. 4 is a view similar to Fig. 1 with the dose measuring device reversed as to position, and enclosed within the bottle, as will hereinafter more fully appear.

Fig. 4 shows a convenient manner of packing the dose measuring device in the neck of the bottle, so as to protect the same and insure it against damage in transportation. In assembling for transportation, as indicated in Figure 4, the dose measuring device is inverted and slipped into the neck of the bottle. A dome-like metal plate 20 is then placed thereover, and the screw cap 11 is applied. Upon disassembling, and reversing the position of the dose measuring device, the metal plate 20 is discarded.

Figure 5:
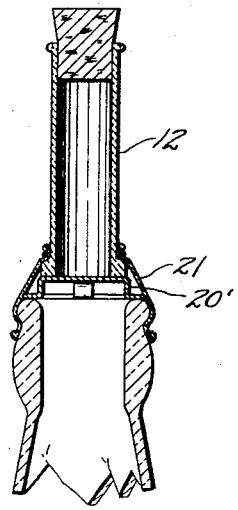
Fig. 5 is a view similar to Fig. 1, showing the invention as applied to the older type of cork-stoppered bottles.
Figure 3:
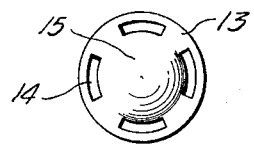
Fig. 3 is a plan view of the cover plate for the mouth of the bottle, such plate constituting the seat of the valve, and being shown as provided with a plurality of perforations, forming passages for the liquid flowing outwardly from the bottle, when the valve is open.
Figure 6:
Fig. 6 is a perspective view of a slightly different form of cover plate, designed for use in connection with the dose measuring device shown in Fig. 5.
Figure 2:
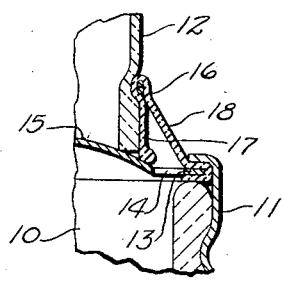
Fig. 2 is an enlarged fragmentary sectional view of the parts shown in Fig. 1, illustrating somewhat more clearly the structural features of the invention.

Fig. 5 shows how my invention may be applied to bottles of the older type, which are not threaded for the accommodation of a screw cap, but are closed by corks. In adapting my invention to this older type of bottle, I shape a metal disc, perforated similarly to the cover plate 13 shown in Fig. 3, and displace bodily the central section thereof to provide a spider 20' having an elevated flat surface, as shown in Fig. 6. A resilient rubber nipple 21 embraces the lower end of the tubular section 12, and also the bead about the mouth of the bottle, so as to retain the spider 20' upon the neck of the bottle, and hold the lower end of the tubular section 12 in engagement with the flat surface of the spider. The dispensing operation through the opening of the valve is as before described.

In all forms of the invention, the spaced perforations in the cover plate are located outside of the imperforate central area of the plate which is engaged by the open lower end of the tubular section 12 to form the valve, and in order to permit reversal of the tubular section for packing and transportation, the diameter of the said tubular section must be less than that of the throat of the bottle.

Having thus described my invention, what I claim and desire to secure by Letters Patent of the United States, is:

1. A dose measuring device comprising a perforated cover plate adapted to be positioned at the mouth of a bottle and a dose measuring tube engaged at its lower end with the said cover plate to form a closed valve in the line of such engagement, combined with means for yieldingly holding the dose measuring tube in position upon the bottle, whereby the said tube may be turned from its axial alignment and the valve opened to permit the flow of liquid from the bottle to the dose measuring tube.

2. A dose measuring device comprising a perforated cover plate adapted to be positioned over the mouth of a bottle and a dose measuring tube with its lower end engaging the said cover plate to form a closed valve in the line of such engagement, combined with resilient means engaged with both the dose measuring tube and the cover plate and acting to connect them yieldingly, whereby the said tube may be turned from its axial alignment and the valve opened to permit the flow of liquid from the bottle to the dose measuring tube.

3. A dose measuring device comprising a cover plate having an imperforate center with perforations arranged about such center and adapted to be positioned over the mouth of a bottle and a dose measuring tube disposed with its lower end in engagement with the said imperforate center to form a closed valve in the line of such engagement, combined with means for yieldingly holding the dose measuring tube in position upon the bottle, whereby the said tube may be turned from its axial alignment and the valve opened to permit the flow of liquid from the bottle to the dose measuring tube.

4. A dose measuring device comprising a perforated cover plate adapted to be positioned over the mouth of a bottle, a dose measuring tube with its lower end engaging the said cover plate to form a closed valve in the line of such engagement, combined with resilient means for yieldingly connecting the dose measuring tube with the cover plate, and means for holding the cover plate upon the bottle, whereby the said tube may be turned from its axial alignment and the valve opened to permit the flow of liquid from the bottle to the dose measuring tube.

5. In combination, a bottle and a dose measuring tube, with means for yieldingly supporting the tube with one end at the mouth of the bottle to constitute a normally closed valve between the bottle and the tube, whereby upon deflecting the other end of the tube, the valve may be opened to permit flow from the bottle into the tube.

6. In combination, a bottle and a dose measuring device, the latter comprising a dose measuring tube of smaller diameter than the throat of the bottle, with means for yieldingly supporting the tube with its lower end at the mouth of the bottle to constitute a normally closed valve between the bottle and the tube, whereby reverse positioning may be effected with the tube disposed in the throat of the bottle, to avoid breakage in transportation.

7. In combination, a bottle and a dose measuring device, the latter comprising a cover plate adapted to be positioned over the mouth of the bottle, a dose measuring tube with its lower end engaging the said cover plate and of smaller diameter than the throat of the bottle, means for yieldingly holding the tube upon the plate to constitute a normally closed valve at their meeting line, and means for holding the tube and plate upon the bottle, whereby reverse positioning may be effected with the tube disposed in the throat of the bottle, to avoid breakage in transportation.

In testimony whereof, I have signed my name at St. Petersburg, Florida, this 24th day of December, 1930.

GEORGE H. MAAS.